P. W. PRATT.
RESILIENT TREAD.
APPLICATION FILED MAR. 23, 1912.

1,082,096.

Patented Dec. 23, 1913.

Witnesses:
Forrest R. Roulstone
E. Batchelder

Inventor:
P. W. Pratt
by Wright Brown Quinby May
Attys.

UNITED STATES PATENT OFFICE.

PHILIP W. PRATT, OF BOSTON, MASSACHUSETTS.

RESILIENT TREAD.

1,082,096. Specification of Letters Patent. Patented Dec. 23, 1913.

Application filed March 23, 1912. Serial No. 685,891.

*To all whom it may concern:*

Be it known that I, PHILIP W. PRATT, a citizen of the United States, and a resident of Boston, in the county of Suffolk and State of Massachusetts, have invented certain new and useful Improvements in Resilient Treads, of which the following is a specification.

This invention relates to resilient treads, particularly in the shape of elastic tires for vehicle wheels, although adapted for other purposes such as stair treads, boot and shoe heels and soles, etc.

The object of the invention is to provide an elastic tread having relatively inelastic inserts or plugs, of non-slipping character, the plugs being so arranged that they are operative for the purposes for which they are intended during the entire life of the elastic tread, without detracting materially from the resilience of the tread.

The invention is embodied in a resilient tread comprising a body of elastic material having a tread face which may be the outer surface of an elastic vehicle tire, and a back face which may be the inner surface of the tire bearing on the rigid rim of the wheel, a series of anti-slipping outer plugs extending inwardly from the tread face, partly but not entirely to the back face, and a series of similar inner plugs extending outwardly from the inner face partly but not entirely to the outer face and alternating with the outer plugs.

Figure 1:
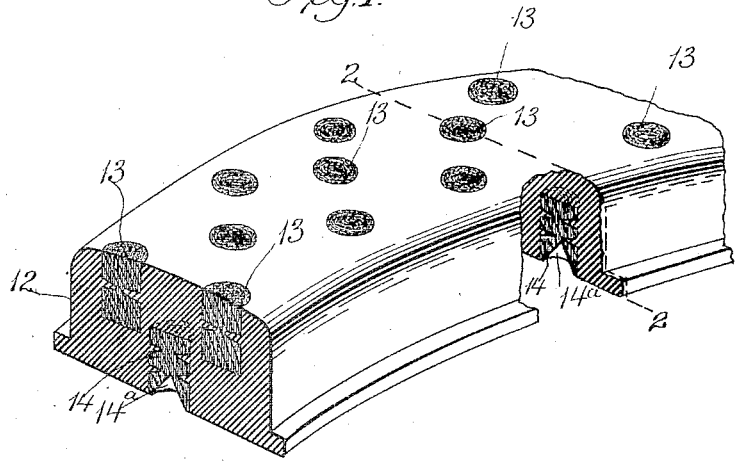
Figure 2:
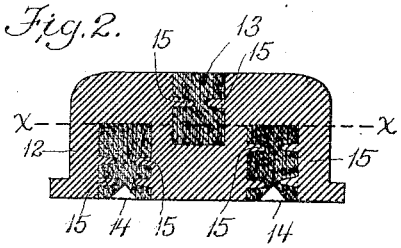

Of the accompanying drawings, forming a part of this specification,—Figure 1 represents a perspective sectional view of a portion of an elastic tire embodying my invention. Fig. 2 represents a section on line 2—2 of Fig. 1.

In the drawings, 12 represents an elastic body which may be composed of any of the compositions of which so-called solid rubber tires are usually made. In the outer face of the body 12 are inserted a series of outer plugs 13, the outer ends of which are flush with the outer face of the body 12, while their inner ends are separated from the inner face of said body by a considerable part of the thickness of said body.

In the inner or back face of the body 12, are inserted a series of inner plugs 14, which alternate with the outer plugs and have their inner ends flush with the inner or back face of the body 12, their outer ends being separated from the outer face of the body by a considerable thickness of the latter. Each of the said plugs is preferably formed by rolling a sheet of cotton duck, or other suitable textile fabric, suitably frictioned or treated with unvulcanized rubber in solution, into a solid cylinder. The plugs are inserted, while the rubber therein is unvulcanized, into the unvulcanized body 12, the whole being then subjected to vulcanizing heat in a suitable mold or container. The vulcanization of the rubber of the body 12 and plugs 14 causes a firm and intimate union between the body and the plugs and between the convolutions of the fabric of which the plugs are composed.

The first wear on the body 12 is sustained by the outer plugs 13, and not by the inner plugs 14, there being no wear on the inner plugs until the outer plugs and the body 12 have been worn down to the line $x$—$x$, Fig. 2. During this period of wear, the outer plugs 13 are cushioned by the elastic material between their inner ends and the back face of the body 12, the material between the inner plugs 14 and the outer face of the body 12 being free to expand and contract. When the body 12 has been worn to the extent indicated by Fig. 2, the inner plugs 14 are exposed and impart an anti-slipping quality to the partially worn tire.

The plugs may be laterally perforated to form recesses or pockets 15, which are filled by the material of which the body 12 is made, these perforations and fillings rendering the plugs longitudinally compressible to some extent.

The inner plugs 14 should have a considerable degree of longitudinal compressibility or elasticity so that when they are exposed by wear, their tread ends will yield inwardly with the surrounding surface of the body 12. Fig. 1 shows the inner ends of the plugs 14 provided with recesses or cups 14ᵃ for this purpose.

Fig. 2 shows the inner plugs provided with a greater number of recesses or pockets 15 than the outer plugs, these recesses or pockets accomplishing the same purpose as the recesses 14ᵃ.

As has been stated, the wear on the body 12 first causes the outer plugs 13 to serve their purpose to prevent the body being worn away. At such time the inner plugs 14 are serving no purpose, other than to render the body substantially uniform throughout all its parts, so far as concerns radial rigidity. By this I mean that, since the plugs of fabric and rubber are necessarily less elastic than the body 12, the presence of the large number of plugs 13 and 14 in the body, substantially equally spaced circumferentially, renders the body, as a whole, quite uniform. At the same time, however, the structure of the body with the inner and outer series, as illustrated, leaves a great deal more of the elastic material of the body than would be the case if the plugs extended all the way through the body. As illustrated in the drawings, the plugs 14 of the inner series alternate with and overlap the inner ends of the plugs 13 of the outer series. By overlapping, I mean that the outer ends of the plugs 14 are nearer to the tread face of the body than the inner ends of the plugs 13, as clearly shown in Fig. 2. Therefore, when wear has occurred down to the line $x$—$x$ of Fig. 2, the tire will possess ample anti-slipping quality, even though the small remaining portions of the plugs 13 should drop or be forced out. This could not be the case if the plugs of the different series did not overlap each other in the manner described.

The construction is such that there will be a continuous fiber surface presented as the body wears, and yet it avoids the rigidity that would result from extending the plugs all the way through from the tread to the inner face of the body 12.

I claim:—

1. A resilient tread comprising a body of elastic material and a plurality of series of anti-slipping plugs of fabric embedded in said body, the plugs of one series extending inwardly from the tread face of said body but not through to the back face, the plugs of the next series alternating with and overlapping the inner ends of the plugs of the first-mentioned series but not extending to the outer or tread face, whereby the continuity of the function of the plugs will be preserved during wear without imparting undue radial rigidity by the employment of plugs.

2. A resilient tread comprising a body of elastic material having a tread face and a back face, a series of anti-slipping outer plugs extending inwardly from the tread face partly but not entirely to the back face, and a series of similar inner plugs extending outwardly from the inner face partly but not entirely to the outer face, and alternating with the outer plugs, said plugs having lateral recesses to render them longitudinally compressible.

3. A resilient tread comprising a body of elastic material having a tread face and a back face, a series of anti-slipping outer plugs extending inwardly from the tread face partly but not entirely to the back face, and a series of similar inner plugs extending outwardly from the inner face partly but not entirely to the outer face, and alternating with the outer plugs, said plugs having lateral recesses to render them longitudinally compressible, the inner plugs being provided with a greater number of said recesses than the outer plugs to render said inner plugs more compressible than the outer plugs.

In testimony whereof I have affixed my signature, in presence of two witnesses.

PHILIP W. PRATT.

Witnesses:
C. F. BROWN,
H. L. ROBBINS.